United States Patent [19]

Hattemer

[11] 4,359,358

[45] Nov. 16, 1982

[54] IN-STORE COUPON AND METHODS

[75] Inventor: James C. Hattemer, Cincinnati, Ohio

[73] Assignee: Graphic Resources, Inc., Cincinnati, Ohio

[21] Appl. No.: 286,645

[22] Filed: Jul. 24, 1981

Related U.S. Application Data

[62] Division of Ser. No. 130,629, Mar. 17, 1980, Pat. No. 4,281,762.

[51] Int. Cl.³ .......................... B32B 31/00; B31D 1/02

[52] U.S. Cl. .................................... 156/248; 156/267; 156/268; 156/277; 156/301; 156/344; 156/248; 428/41; 428/914; 493/401; 206/460

[58] Field of Search ............... 156/248, 253, 254, 267, 156/285, 268, 270, 277, 289, 290, 301, 291, 301, 344, 387, 582; 428/41, 40, 42, 47, 914; 493/400, 401, 402, 403; 206/390, 459, 447, 460

[56] References Cited

U.S. PATENT DOCUMENTS

| | | | |
|---|---|---|---|
| 581,494 | 4/1897 | Schwab . | |
| 814,592 | 3/1906 | Duane . | |
| 1,004,055 | 9/1911 | Martin et al. . | |
| 2,023,829 | 12/1935 | Wright . | |
| 2,095,437 | 4/1936 | Fox . | |
| 2,304,787 | 12/1942 | Avery . | |
| 2,391,539 | 12/1945 | Avery . | |
| 2,603,899 | 7/1952 | Leander . | |
| 2,783,172 | 2/1957 | Avery . | |
| 2,936,540 | 5/1960 | Power . | |
| 3,148,820 | 9/1964 | Robbins et al. . | |
| 3,166,186 | 1/1965 | Karn | 156/253 |
| 3,226,862 | 1/1966 | Gabruk . | |
| 3,464,883 | 9/1969 | Moline et al. . | |
| 3,484,976 | 12/1969 | Shea . | |
| 3,522,136 | 7/1970 | Williams et al. . | |
| 3,524,782 | 8/1970 | Buske . | |
| 3,638,340 | 2/1972 | Gottschalk . | |
| 3,702,511 | 11/1972 | Miller . | |
| 3,799,829 | 3/1974 | Heatwole . | |
| 3,841,936 | 10/1974 | Fergg et al. . | |
| 3,914,483 | 10/1975 | Stipek, Jr. . | |
| 3,916,051 | 10/1975 | Wakeman . | |
| 3,917,276 | 11/1975 | Green Barg . | |
| 3,925,585 | 12/1975 | Aoyagi . | |
| 3,963,124 | 6/1976 | Banks . | |
| 3,987,960 | 10/1976 | Gardiner . | |
| 4,029,341 | 6/1977 | Neill et al. . | |
| 4,103,820 | 8/1978 | Mathison et al. . | |
| 4,153,496 | 5/1979 | Swift | 156/248 |

FOREIGN PATENT DOCUMENTS

| | | | |
|---|---|---|---|
| 998978 | 1/1952 | France . | |
| 105313 | 12/1964 | Norway . | |

*Primary Examiner*—Edward C. Kimlin
*Assistant Examiner*—L. Falasco
*Attorney, Agent, or Firm*—Wood, Herron & Evans

[57] ABSTRACT

A composite in-store coupon preferably comprises a base sheet with adhesive for securing the sheet to a product, and a top sheet comprising, in part, a removable in-store coupon. The top sheet has side portions permanently secured to the underlying base sheet and a central coupon portion free of said base sheet and detachably secured to and between said side portions. The central coupon portion is printed on one or both sides and is removable to provide an in-store coupon. A preferred method of forming the composite coupon includes: printing a first web in predetermined central coupon areas, applying glue to a second web, carried on a backing web, in glue areas corresponding to side portions of the central coupon areas in the first web, joining the first and second webs such that side portions adjacent said central coupon areas are joined to the glue areas of the second web, cutting the webs into distinct composite coupons having a base sheet and top sheet, removing waste web material and winding the backing web, with a plurality of distinct composite coupons thereon, to form a supply roll, or folding the backing web to a fan folded supply, with central coupon portions of the respective top sheets being removable.

4 Claims, 6 Drawing Figures

IN-STORE COUPON AND METHODS

This is a division, of application Ser. No. 130,629, filed Mar. 17, 1980, U.S. Pat. No. 4,281,762.

This invention relates to coupons and more particularly to an improved composite coupon of the in-store type and methods for making same.

The in-store coupon concept is a relatively old one. Basically, a coupon is removed from a product by the buyer at the time of purchase, and the coupon is then redeemed or used for a discount on the same or another product at the time of purchase. In this operation, the coupons must be readily removable from the initial product but cannot be so loosely secured as to become unintentionally detached during shipping, stocking and the like. Moreover, it is desireable to make as complete a use of the coupon as possible, or in other words to provide as much printing space as possible on the coupon. Finally, the coupons must be supplied in a form which provides ready handling of a coupon supply and in a form which facilitates coupon application to products.

Accordingly, it has been one objective of the present invention to provide an improved in-store coupon.

A further objective of the invention has been to provide an improved in-store coupon supply.

A further objective of the invention has been to provide a composite coupon having a maximum of printing space.

A further objective has been to provide a composite removable coupon and a label.

A still further objective of the invention has been to provide a method for manufacturing composite coupons or labels.

To these ends, a preferred embodiment of the invention includes a composite structure providing a removable in-store coupon. The structure includes a base sheet capable of being secured to a product either by the application of adhesive to the sheet or by a pre-coated adhesive on the sheet. Preferably, the base sheet is provided with pressure sensitive adhesive and a backing. Additionally, the structure includes a top sheet having side portions and a removable central portion therebetween. The side portions are secured, by glue, to side areas of the base sheet, but the central portion is free of the base sheet. Lines of weakness, such as perforations, separate the central portion from the side portions. Thus, the central portion, forming the in-store coupon, is separable from the side portions and the base sheet, and the entire top sheet is coextensive with the base sheet.

The central portion of the top sheet may be printed on both sides, since neither side is glued, and the base sheet, beneath the central portion, may also be printed, forming a label which remains with the product.

In manufacturing the composite structure, a first web is printed in specific but undefined central coupon areas and on one or both sides. A second web, releasably held by pressure sensitive adhesive on a backing web, is also printed in a specific area. Glue is applied to predetermined side areas of the second web and the two webs are joined, the side areas adjacent to the printing of the first web being joined to the predetermined glue bearing side areas of the second web.

Thereafter, the composite webs are die cut around the central area and side portions to form individual composite structures on the backing web, and the surrounding web remnant, in two layers, is removed.

During cutting, lines of weakness, such as perforations, are formed between the central areas and the side portions of at least the top sheet.

The backing web, now bearing individual and distinct composite coupons, is then rolled to form a coupon supply roll. Alternately, the backing web can be fan folded. Thereafter, the coupons are removed from the backing web and applied to products in any suitable fashion, whereupon the central coupon portion of the top sheet provides a removable in-store coupon, printed on one or both sides, and the remaining side portions together with the central underlying area of the base sheet define a label which remains with the product.

Further advantages and objectives of the invention will become readily apparent from the following detailed description of a preferred embodiment of the invention, and form the drawings in which.

Figure 1:
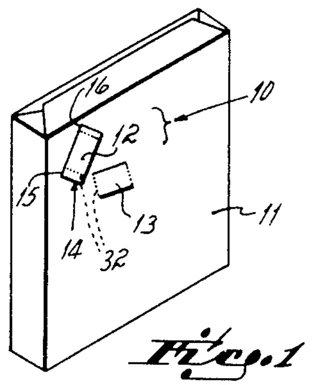
FIG. 1 is a perspective view of a container with a composite coupon, according to the invention, showing the central coupon portion removed.

Turning now to the drawings, there is shown in FIG. 1 an illustration of a composite in-store coupon 10 in place on a container such as a product box 11. The composite in-store coupon 10 basically comprises two parts, a base sheet 12, adhesively secured to the box 11, and a removable in-store coupon 13 which comprises a central portion of a top sheet 14. The sides 15 and 16 of the top sheet 14 are shown in FIG. 1 as still being attached to the base sheet 12, while the removable in-store portion 13 of the in-store coupon 10 has been removed therefrom in order to illustrate the removal of the in-store coupon portion from the base portion 12.

Figure 3:
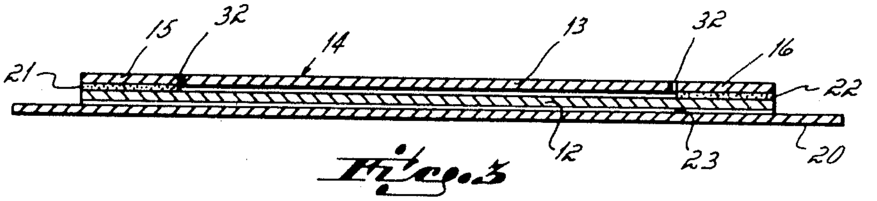
FIG. 3 is a cross-sectional view of a typical composite coupon taken along lines 3—3 of FIG. 2.

Turning now to FIG. 3, a cross-section of the composite in-store coupon 10 is shown in association with a backing sheet 20 on which the coupons are formed. The composite coupon 10 includes the top sheet 14, having a central portion 13 and side portions 15 and 16. The side portions 15 and 16 are respectively adhered to the base sheet 12 by means of adhesive as at 21 and 22. A pressure sensitive adhesive 23, covering the bottom side of the base sheet 12, secures the base sheet 12 and thus the composite coupon to the backing web 20.

Alternatively, other types of pre-coating adhesives could be used such as, for example, thermosetting or water activated adhesives. Still farther adhesive precoating could be eliminated and the base sheets could be supplied with no adhesives for use as cut labels or in other supply formats in labeling machines supplying their own glue to the base sheet. Of course, the preferred embodiment contemplates coupons in rolled form on a backing web where pressure sensitive adhesives are used. Coupons could be supplied in separate cut form with any type adhesive, including pressure sensitive, or the other types mentioned above.

Figure 2:
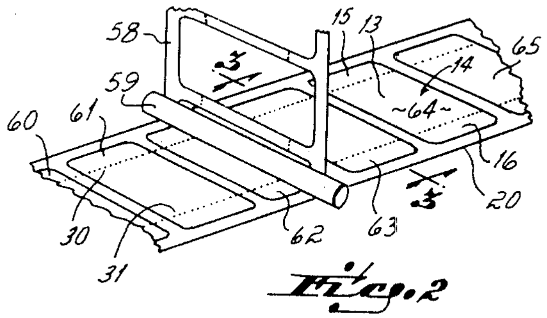
FIG. 2 is a perspective view of a line of the coupons of FIG. 1, illustrating one portion of the coupon forming process.

As shown in FIGS. 2 and 3, lines of weakness 30 and 31 comprising, for example, perforations 32 (FIG. 3) are provided in at least the top sheet 14 of the composite coupon. These permit the central portion 13 to be removed from the side portions 15 and 16.

Accordingly, the composite coupon 10 includes the base sheet 12, the top sheet 14, the pressure sensitive adhesive 23 on the lower side of base sheet 12, and adhesive areas 21 and 22 on the upper side thereof securing the side portions 15 and 16 of the top sheet 14 respectively thereto. The central portion 13 of the top sheet 14 is free of the base sheet 12, the central portion 13 thus being removable from the composite coupon by means of the perforations 32 in order to provide a removable in-store coupon as shown in FIG. 1.

Figure 4:
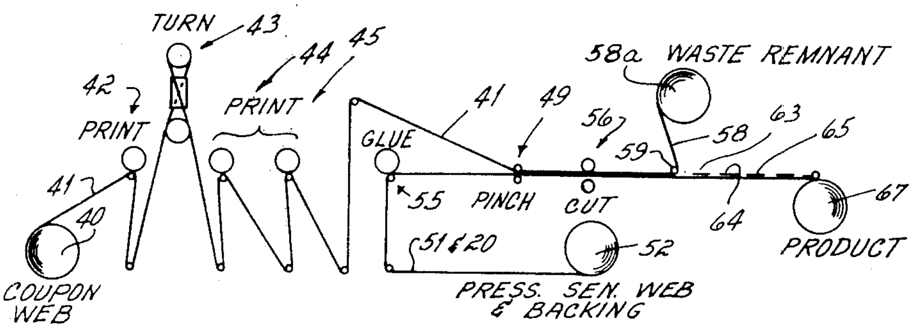
FIG. 4 is a diagrammatic elevational view of a method for making coupons according to the invention.

Turning now to FIG. 4 and the method by which the composite coupons 10 are formed, it will be appreciated that the manufacturing operation is preferably conducted on a printing apparatus known in the industry as a "Mark Andy", model 2100, in-line flexographic printing, die cutting, and laminating press. Such apparatus is available from Mark Andy, Incorporated, 18081 Chesterfield Airport Road, Chesterfield, Mo., 63017. While other suitable apparatus may be useful in forming the composite coupon 10 of the invention, this apparatus is particularly useful, as will be described.

In FIG. 4, first web material 41 of indeterminate length is supplied in the form of roll 40 and is run through a first print station 42 where an upper side of the web is printed in predetermined but undefined coupon areas. From station 42, the web 41 is then conveyed around a turn bar apparatus 43 which serves to flop the web 180° so that the reverse unprinted side is turned upwardly. The web 41 is then run through a second print station 44 and optionally a third print station 45 for printing the now upper side of the web in opposite side areas corresponding to predetermined but undefined coupon areas.

It should be appreciated that the first print station 42 is optional and is used where it is desired to print on the bottom side of the top sheet 14 of the composite coupon as will be described. Thus, in the embodiment shown in FIG. 4, the first print station 42 is operable to print on the web in undefined, but predetermined, coupon areas which correspond to the lower side of the central portion 13 of what will be the top sheet 14 of the various coupons. The second and third print stations 44 and 45 are utilized to print in predetermined, but as yet undefined, coupon areas which will form the upper side of the top sheet 14, including the central area 13 and side portions 15 and 16. At station 42, it is generally not preferable to print on the lower areas of the side portions 15 and 16 since those areas will be adhered by the glue 21 and 22 to the base sheet 12 and will thus not be visible to the customer. Accordingly, printing or other indicia or graphics can be placed on a central portion of the base sheet 12, on the entire upper face of top sheet 14, and on the central portion of the opposite face of top sheet 14.

From the printing and turn bar stations 42 through 45, the elongated web 41 (now with indicia on at least one side thereof in a central, but as yet undefined, area corresponding to the central portion 13 of what will be the top sheet 14) is directed beneath a pinch roller station 49 for joining together with a second elongated web 51 of indeterminate length. This second web 51 is adhered by pressure sensitive adhesive to a backing or carrier web 20 of indeterminate length. In this connection, the second web 51 and backing web 20 are supplied in roll form 52 as shown in FIG. 4. At least portions of the second web 51, which will form the base sheets 12, are provided with a pressure sensitive adhesive 23 on the back thereof, adhering web 51 to the backing web 20.

The second web 51 and backing web 20 are removed from the roll 52 and are conveyed through a glue station 55 where glue is applied to the web 51 on predetermined side areas 21, 22 along the web 51. These glue areas correspond in predetermined fashion to the side portions 15 and 16 of the top sheets 14 as will be formed from the web 41.

From the glue station 55, the web 51 and backing web 20 are conveyed to the nip formed by the pinch roller station 49 where the webs 41 and 51 are pressed together. Upon joining, the adhesive at 21 and 22 (FIG. 3) secures the lower web 51 to the top web 41 in areas corresponding to the side portions 15 and 16 of the top sheet 14. At this stage, of course, boundaries of distinct coupons, including the base sheet and the top sheet, are as yet undefined. It will be appreciated, however, that the adhesive 21 and 22 lies on either side of a central area which will form the removable central portion 13 of the top sheet 14.

From the nip, the joined webs are conveyed to a die cutting station 56. At the die cutting stations, separate, distinct coupons are defined in the joined webs 41 and 51. This is best seen, for example, in FIG. 2 which illustrates at least portions of now defined coupons 60 through 65.

After the coupons have been cut at the die cutting station 56, the waste web remnant 58 is removed from the composite coupons, as shown in FIG. 2, at the roller 59, leaving in effect separate and distinct composite coupons 63, 64 and 65 on the backing web 20. From the roller 59, the waste remnant 58 is wound upon a roll **58*a***.

It should also be mentioned that at the die cutting station 56, lines of weakness 30 and 31, comprising, for example, perforations 32, are supplied in at least upper web 41, thus separating the central portions 13 of top sheet 14 from the side portions 15 and 16. Accordingly, then, the composite coupons 63, 64 and 65 on the backing web 20 take the preferred cross-sectional form as shown in FIG. 3. Of course, cutting perforations into base sheet 12 will not affect the performance of the composite coupon since the entire base sheet is to be adhered to the product. From the cutting or perforating operation, the backing web 20 is then rolled to form a rolled in-store coupon supply 67, including an elongated backing web supporting thereon removable, distinct, composite in-store coupons and labels.

It should be appreciated, with respect to the description of the method of FIG. 4, that the turning station 43, the print stations 42, 44 and 45, the glue station 55 and the die cutting stations 56 may all comprise any suitable apparatus which is well-known in the art for printing, for turning the first web, for gluing the second web, and for die cutting at least the top web. The "Mark Andy" apparatus is mentioned as being illustrative of one apparatus suitable for forming the coupon supply.

In use, the roll supply 67 can be utilized on a product labeling machine of any known type. For example, one form of such machine is diagrammatically illustrated in FIG. 5. This apparatus serves to bend the backing web 20 sharply away from the coupons and then attaches the coupons to the product by means of an airblast or some mechanical means which do not form part of this invention. The pressure sensitive adhesive 23 on the rear side of the respective base sheets 12 adheres the composite coupons to the product.

Figure 5:
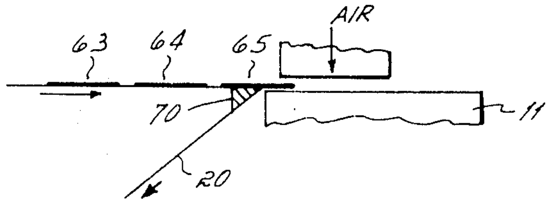
FIG. 5 illustrates a typical coupon application operation for explanation.

While this is only one manner in which the in-store coupons herein can be applied, it should also be appreciated that the composite construction of the in-store coupon 10 greatly facilitates the application of labels to products 11, by the means illustrated in FIG. 5. When the backing web 20 is bent sharply around a corner 70 while the coupons must remain very rigid so as not to bend before actually engaging the product, such bending could cause folds in the coupon, mis-registration, sticking of the label to itself, or other undesireable circumstances. Light, single-ply labels, for example, tend to bend or droop in such an operation resulting in poor label indexing and placement on the products, and at the least, in poor label control between point of removal from the backing and point of application. In this invention, the two-ply construction of the coupons produces a relatively rigid workpiece, greatly facilitating coupon control, placement and handling without unnecessary bending, drooping, folding or the like.

In use, then, the composite coupons may provide both an in-store removable coupon and a product label. The top side of the top sheet 14 may be totally printed across its entire face with the side portions 15 and 16 being compatible with the indicia on the central portion 13. Alternatively, the side portions 15 and 16 may bear indicia which is compatible with printed indicia on the central area of the base sheet 12 which will become visible when the removable portion 13 of sheet 14 is detached. Thus, side portions 15 and 16, together with a central portion of base sheet 12, form a label remaining with with the product. Additionally, the underneath side of the central coupon area 13 may also be provided with printed indicia relative, for example, to the coupon program. In any event, the central coupon area 13 itself comprises the removable in-store coupon while the remaining base sheet 12 and the side portions 15 and 16 normally stay on the product.

Figure 6:
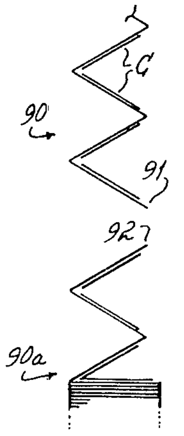
FIG. 6 is an illustrative view of an alternate embodiment fan folded label supply shown in expanded form.

In an alternate embodiment, the joined sheets are carried on the backing web and that web is fan-folded, instead of being rolled, to provide a fan-folded coupon supply 90 (FIG. 6) with one or more coupons on a flat section of the folded carrier. This permits use of the coupon supply in a fast continuous operation, the trailing end 91 of the supply always being free for splicing onto the leading edge 92 of a re-fill supply 90*a* where the coupons are supplied in roll form, splicing to new rolls during operation is difficult since the web end is always interior of the roll.

I claim:

1. A method of manufacturing removable in-store coupons comprising the steps of:

passing a first web of indeterminate length through at least one printing station; said web having a plurality of distinct, and as yet undefined, coupon areas thereon;

printing indicia on said web on at least one side thereof and in at least central portions of said areas, said areas also including side portions;

passing a second laminated web, comprising a backing web and a base web held thereon by pressure sensitive adhesive, through a glue station and applying glue to said base web in glue areas to be correlated with said side portions of said coupon areas;

joining said webs, said glue areas of said base web corresponding and contacting said side portions of said coupon areas and adhering thereto;

cutting said first web and said base web co-extensively to form distinct, defined coupons corresponding to said undefined coupon areas, said coupons having an upper coupon sheet; formed from said first web, secured at said side portions to an underlying base sheet formed from said base web;

providing lines of weakness between side portions and central portions of said upper coupon sheet;

removing from said backing web remnant portions of said first web and said base web outside of distinct coupons; and rolling said backing web into a supply roll with said distinct coupons thereon, a central portion of said upper coupon sheet being detachable from said side portions thereof.

2. A method as in claim 1 wherein said cutting step includes perforating said first web between said side portions and said central portions.

3. A method as in claim 1 including the step of printing indicia on said base web in areas corresponding to said central portions of said coupon areas and prior to joining said webs.

4. A method as in claim 1 wherein said printing steps comprise printing on both sides of said first web in areas spacially corresponding to said coupon areas.

* * * * *